United States Patent
Huang et al.

(10) Patent No.: US 12,303,952 B2
(45) Date of Patent: May 20, 2025

(54) PRETREATMENT METHOD FOR OPENING WASTE WOOL TEXTILES

(71) Applicant: GUANGDONG UNIVERSITY OF TECHNOLOGY, Guangdong (CN)

(72) Inventors: Xinxin Huang, Guangdong (CN); Tong Deng, Guangdong (CN)

(73) Assignee: GUANGDONG UNIVERSITY OF TECHNOLOGY, Guangdong (CN)

( * ) Notice: Subject to any disclaimer, the term of this patent is extended or adjusted under 35 U.S.C. 154(b) by 0 days.

(21) Appl. No.: 18/981,658

(22) Filed: Dec. 16, 2024

(65) Prior Publication Data

US 2025/0114831 A1 Apr. 10, 2025

Related U.S. Application Data

(63) Continuation of application No. PCT/CN2024/074613, filed on Jan. 30, 2024.

(30) Foreign Application Priority Data

May 15, 2023 (CN) .......................... 202310543761.0

(51) Int. Cl.
*B09B 3/70* (2022.01)
*B09B 101/85* (2022.01)

(52) U.S. Cl.
CPC ............ *B09B 3/70* (2022.01); *B09B 2101/85* (2022.01)

(58) Field of Classification Search
CPC .............................. B09B 3/70; B09B 2101/85
See application file for complete search history.

(56) References Cited

U.S. PATENT DOCUMENTS

2016/0283917 A1 9/2016 Nunn et al.

FOREIGN PATENT DOCUMENTS

| CN | 101368329 | * | 2/2009 |
|---|---|---|---|
| CN | 102704105 | | 10/2012 |
| CN | 103088497 | * | 5/2013 |
| CN | 103320924 | | 9/2013 |
| CN | 104088162 | * | 10/2014 |
| CN | 104294609 | | 1/2015 |
| CN | 104878491 | * | 9/2015 |
| CN | 107687042 | * | 2/2018 |
| CN | 108998870 | * | 12/2018 |
| CN | 111809291 | | 10/2020 |
| CN | 112981643 | * | 6/2021 |
| CN | 113802375 | | 12/2021 |
| CN | 116556042 | | 8/2023 |
| WO | 9720088 | | 6/1997 |

OTHER PUBLICATIONS

He; Yi-Zhong et al., "Research for recycle process of waste wool fiber", Wool Textile Journal, with English abstract, Sep. 2012, pp. 14-17, vol. 40, No. 9.
Wang; Hong et al., "Analysis on the damage of reused wool fiber", Wool Textile Journal, with English abstract, Mar. 2013, pp. 1-5, vol. 41, No. 3.
Ma; Jing-Xuan et al, "Study on the Durability of Recycled Fiber Woven Fabrics", Journal of Beijing Institute of Clothing Technology, with English abstract, Jun. 2019, pp. 23-29, vol. 39, No. 2.
"International Search Report (Form PCT/ISA/210) of PCT/CN2024/074613," mailed on Mar. 21, 2024, pp. 1-4.
"Written Opinion of the International Searching Authority (Form PCT/ISA/237) of PCT/CN2024/074613," mailed on Mar. 21, 2024, pp. 1-5.
"Office Action of China Counterpart Application", issued on Sep. 20, 2023, with English translation thereof, p. 1-p. 9.

* cited by examiner

*Primary Examiner* — Amina S Khan
(74) *Attorney, Agent, or Firm* — JCIPRNET (57) ABSTRACT

This disclosure discloses a pretreatment method for opening waste wool textiles, comprising the following steps: spraying an oil agent evenly on the surface of waste wool textiles, and then sealing; the amount of the oil agent is 10% to 25% of the mass of waste wool textiles.

7 Claims, 4 Drawing Sheets

PRETREATMENT METHOD FOR OPENING WASTE WOOL TEXTILES

CROSS-REFERENCE TO RELATED APPLICATION

The present application is a continuation of PCT International Application No. PCT/CN2024/074613 filed on Jan. 30, 2024, which claims priority to Chinese patent application No. 202310543761.0, filed on May 15, 2023. The entirety of each of the above-mentioned patent applications is hereby incorporated by reference herein and made a part of this specification.

BACKGROUND

Technical Field

The present disclosure belongs to the technical field of wool processing technology, in particular to a pretreatment method for opening waste wool textiles, and a method for opening waste wool textiles.

Description of Related Art

Wool is a natural fiber with biocompatibility, which has attracted widespread attention in the field of textile technology due to its unique structure, high moisture regain, excellent elasticity and skin-friendly property. Every year, over 2.5 million tons of waste wool are produced worldwide, including discarded wool clothing and inferior wool produced from textile processing. The recycling of waste textiles can promote sustainable development of textiles and reduce environmental pollution.

The physical recycling method (i.e. mechanical opening recycling method) is one of the common methods for recycling and reusing waste textiles, which uses mechanical equipment to dismantle and crush waste textiles into fibers, and then reuse them into textile processing. The opening of waste textiles is actually a mechanical process of dismantling textiles through stretching and tearing, which is similar to the stretching process.

In the research on the opening experiments of wool fabrics, Wang Hong et al. conducted comparative tests on the properties of wool fibers before and after mechanical opening. The results showed that the length of wool fibers after opening was between 15 mm-20 mm, with a length loss of 75% compared to the original fibers and the strength loss was between 20% to 30%. The fiber scale layer was combed off, and the main trunk was damaged and cracked (Wang Hong, Ding Xuemei, Wu Xiongying, "Analysis on the damage of reused wool fiber" [J]. Woolen Technology, 2013, 41 (03): 1-5). Ma Jingxuan et al. compared the opened wool fibers with the original wool fibers, and found that the fiber strength was damaged by 18% and the length was damaged by 43%, resulting in an increase in short fiber content, and the lower durability of the recycled wool/polyester blended fabrics (Ma Jingxuan, Wang Xiaoning, Liao Qing, "Study on the Durability of Recycled Fiber Woven Fabrics [J]. Journal of Beijing Institute of Clothing Technology, 2019, 39 (02): 23-29.).

Therefore, in the physical recycling process, the fibers obtained from waste textiles by means of mechanical impact are shorter in length, and the fiber is easily damaged. How to minimize the fiber damage during mechanical opening is the most urgent problem that needs to be solved in the mechanical opening and recycling.

SUMMARY OF THE DISCLOSURE

Based on the above, the object of the present disclosure is to provide a pretreatment method for opening waste wool textiles and a method for opening waste wool textiles.

The first aspect of the present disclosure is to provide a pretreatment method for opening waste wool textiles, which comprises the following steps:
  spraying an oil agent evenly on the surface of waste wool textiles, and then sealing; wherein, the amount of the oil agent is 10% to 25% of the mass of the waste wool textiles.

The second aspect of the present disclosure is to provide a method for opening waste wool textiles, which comprises the following steps:
  S.1. pretreatment: spraying an oil agent evenly on the surface of waste wool textiles, sealing for 20 hours to 30 hours; wherein the amount of the oil agent is 10% to 25% of the mass of the waste wool textiles; the sealing temperature is 0° C. to 20° C., and moisture regain is 30% to 90%;
  S2. performing opening process.

In the pretreatment method for opening waste wool textiles of the present disclosure, a certain amount of oil agent is sprayed on the waste wool textiles, and pretreat them at a specific temperature and moisture regain. After the pretreatment, the breaking elongation of the yarn is improved, but the yarn strength is reduced. After the pretreatment, the waste wool textiles are physically and mechanically opened. Compared with mechanical opening without pretreatment, the obtained wool fibers have higher fiber length, fineness, and tenacity, and the main body of the wool fiber is protected, which reduces the fiber damage during mechanical opening.

DETAILED DESCRIPTION OF THE DISCLOSURE

To facilitate understanding of the present disclosure, a more comprehensive description will follow. The disclosure may be implemented in many different forms, and should not be limited to the embodiments described herein. On the contrary, the purpose of providing these embodiments is to provide a more thorough and comprehensive understanding of the contents disclosed in the present disclosure.

Unless otherwise defined, all technical and scientific terms used in the present disclosure are the same as commonly understood by those skilled in the art. The terms used in the specification of the present disclosure are only for the purpose of describing specific embodiments, but not used to limit the present disclosure. The term "and/or" used in the present disclosure includes any and all combinations of one or more related listed items.

In some embodiments of the present disclosure, a pretreatment method for opening waste wool textiles is disclosed, comprising the following steps: spraying some oil evenly on the surface of waste wool textiles, and then sealing; wherein, the amount of the oil sprayed was 10% to 25% of the mass of the waste wool textiles.

The inventor of the present disclosure found that performing pretreatment with a certain amount of oil agent to waste wool textiles can effectively reduce the friction performance between fibers, make the yarn soft, improve the breaking elongation of the yarn, and reduce the yarn strength. After this pretreatment, the waste wool textiles can be physically and mechanically opened, and the damage to the fibers during the opening process will be reduced. Specifically, the wool fibers obtained by mechanical opening after pretreatment have a lower ratio of short fibers, higher fiber length, fineness, and tenacity than those obtained by the mechanical opening without pretreatment. Besides, the main body of the wool fiber is protected, which reduces fiber damage during mechanical opening. The amount of the oil agent needs to be kept within an appropriate range. When the amount of the oil agent is too large, it is easy to accumulate on the surface of the fibers, forming a rough film on the fiber surface, which will increase the friction coefficient between fibers, and make the oil agent on the fiber surface to have a sticky effect with metal impurities, which is not conducive to the opening of waste textiles. Therefore, the amount of oil agent used is 10% to 25% of the mass of waste wool textiles.

In some embodiments, the amount of the oil agent is 15% to 25% of the mass of waste wool textiles.

In some embodiments, the amount of the oil agent is 19% to 21% of the mass of waste wool textiles.

In some embodiments, the sealing conditions include a temperature of 0° C. to 20° C. and a moisture regain of 30% to 90%

The ambient temperature and moisture regain during pretreatment will also have a significant impact on the quality of subsequent mechanical opening of wool textiles. When the pretreatment temperature is between 0° C. to 20° C., the moisture in the yarn can fully act with oil, and wool yarn is relatively soft and has a high breaking elongation. After being treated at 40° C. for about 24 hours, the moisture of the wool yarn evaporates, causing the oil agent to accumulate on the fiber surface to form an uneven film layer, resulting in severe cracking and roughness of the fiber surface. The friction between fibers increases, leading to a decrease in yarn strength and elongation. At high temperatures of 50° C. to 60° C., the moisture in the yarn decreases, and the chain segmental movement of wool keratin macromolecules is strengthened, and the intermolecular interaction is weakened, resulting in the disintegration of the intermolecular cross-linking, and the fibers have high flexibility and it's easy to cause yarn deformation. Therefore, the preferred pretreatment temperature is 0° C. to 20° C. The optimal pretreatment temperature is 0° C. to 10° C., and the treatment time is 20 hours to 30 hours. When the moisture regain in the yarn is low (less than 30%), the lubrication effect of water between fibers in the yarn decreases, which is the main reason for the low breaking elongation of the yarn. The breaking elongation of the yarn gradually increases with the increase of moisture regain, which is due to the plasticizing effect of the moisture in the yarn, improving the yarn's mechanical properties and making the wool yarn softer and more elastic. When the moisture regain reaches 90%, the yarn reaches its maximum breaking elongation of 35.2%. The tenacity decreases with the increase of moisture regain, reaching the lowest value at 30% moisture regain, and then it remains basically unchanged as the moisture regain increases. Based on the above analysis, the moisture regain can be 30% to 90% when pretreating wool fabrics before opening.

In some embodiments, the temperature is 0° C. to 10° C.

In some embodiments, the moisture regain is 80% to 90%.

In some embodiments, the sealing treatment time is 20 hours to 30 hours, preferably 22 hours to 26 hours.

In some embodiments, the oil agent is composed of deionized water, wool lubricant, and anti-static agent in a mass ratio of 11 to 13:0.8 to 1.2:0.2 to 0.4.

In some embodiments, the oil agent includes deionized water, wool lubricant, and anti-static agent in a mass ratio of 12:1:0.3.

In some other embodiments of the present disclosure, a method for opening waste wool textiles is also disclosed, which comprises the following steps: before opening, the waste wool textiles are pretreated as described above.

The opening can be mechanical opening, such as using an opening machine.

The waste wool textiles described in the present disclosure may be wool textiles containing wool fibers at a mass content of more than 10%, more than 20%, more than 30%, more than 40%, more than 50%, more than 60%, more than 70%, more than 80%, more than 90%, or even 100%. Wool textiles are products made from fabrics (wool fabrics) mainly containing wool fibers, which can be woven fabrics or knitted fabrics. Wool textiles can be tops, pants, jackets, coats, as well as various products made mainly from wool such as woolen cloth, yarn, blankets, felts, etc.

In the following embodiments, the waste wool textile yarns and fabrics were provided by Shenzhen Jinrongda Knitted Clothing Co., Ltd. The wool yarn used for tensile testing was a 100% pure wool yarn with 21 tex, and the wool fiber length in the yarn was 58 mm, with a fineness of 19.5 microns. The additives were FX-K902N, wool lubricant, and FX-AS30N anti-static agent provided by Beijing Fangxing Additive Co., Ltd. Wherein, the relevant specifications and parameters of waste wool textile fabrics were shown as follows:

Fabric structure: weft knitted plain; yarn linear density (tex): 21; fabric horizontal density (circle/5 cm): 55; fabric longitudinal density (circle/5 cm): 44; fabric thickness (mm): 0.48; square meter weight (g/m$^2$): 182.

In the following embodiments, the tensile test of wool yarns was conducted in accordance with the standard GB/T 3916-2013 "Testing of Tensile Strength and Breaking Elongation of Single Yarn". The tensile test was conducted by using a universal tensile testing machine with a clamping distance of 250 mm and a tensile speed of 500 mm/min. The relationships between the tenacity or the breaking elongation of wool yarns and different pretreatment conditions can be obtained from the tensile test. The tensile test of wool fibers after opening adopts the standard GB/T 4711-1984 "Test Method for Tensile tenacity and Elongation of Single Wool Fibers" with a clamping distance of 20 mm, a tensile speed of 20 mm/min, and a pretension of 9 millinewtons/tex. The fiber fineness test after mechanical opening adopts the standard GB/T 10685-2007 "Wool Fiber Diameter Test Method, Projection Microscope Method", with a magnification of 500 times, the obtained indicators include average fiber fineness and coefficient of variation. The fiber length obtained by mechanical opening was measured using the layout method according to the standard GB/T 19722-2005 "Washing Sheep Wool". The available indicators include average fiber length, coefficient of variation, short fiber content, and fiber length loss rate, wherein the fiber length loss rate is calculated using the following formula:

$$S = \frac{A-B}{A} \times 100\%$$

wherein, S is the fiber length loss rate, %; A is the fiber length before opening, mm; B is the fiber length after opening, mm.

With reference to the drawings and specific embodiments, the present disclosure is described in detail as below.

Embodiment 1: Pretreatment Method for Opening Waste Wool Textiles

The pretreatment method for opening waste wool textiles in this embodiment included the following steps:
(1) an oil agent was prepared in a laboratory with a room temperature of 20° C. and a relative humidity of 65%. 36 g of deionized water at room temperature (20° C.), 3 g of wool lubricant, and 0.9 g of anti-static agent (deionized water:wool lubricant:anti-static agent=12:1:0.3) were prepared, and put into a 100 ml conical flask, stirred at 20° C. for 20 minutes to 30 minutes using a magnetic stirrer (RCT basic type) until the aqueous solution was clear and transparent. The prepared oil agent should be used within the same day.
(2) After evenly spraying the oil agent with the amount of 20% of the mass of waste wool textiles on the surface of waste wool textiles, the waste wool textiles were sealed at 0° C. and 90% moisture regain for 24 hours.

Embodiment 2: Pretreatment Method for Opening Waste Wool Textiles

The pretreatment method for opening waste wool textiles in this embodiment included the following steps:
(1) The preparation method of the oil agent was the same as that in embodiment 1;
(2) After evenly spraying the oil agent with the amount of 15% of the mass of waste wool textiles on the surface of waste wool textiles, the waste wool textiles were sealed at 10° C. and 80% moisture regain for 24 hours.

Embodiment 3: Pretreatment Method for Opening Waste Wool Textiles

The pretreatment method for opening of waste wool textiles in this embodiment included the following steps:
(1) The preparation method of the oil agent was the same as that of embodiment 1;
(2) After evenly spraying the oil agent with the amount of 25% of the mass of waste wool textiles on the surface of waste wool textiles, the waste wool textiles were sealed at 20° C. and 60% moisture regain for 24 hours.

Experimental Embodiment 1: Effects of Different Oil Agent Ratios on the Tensile Properties of Waste Wool Yarns The prepared oil agent (as in embodiment 1) was evenly sprayed on the surface of the waste wool yarns with mass ratios of 0%, 5%, 10%, 15%, 20%, and 25% of the waste wool yarns. Then, the yarns were placed in a constant temperature and humidity box (20° C., RH65%) and sealed for 24 hours before conducting tensile performance tests in the laboratory.

Figure 1:
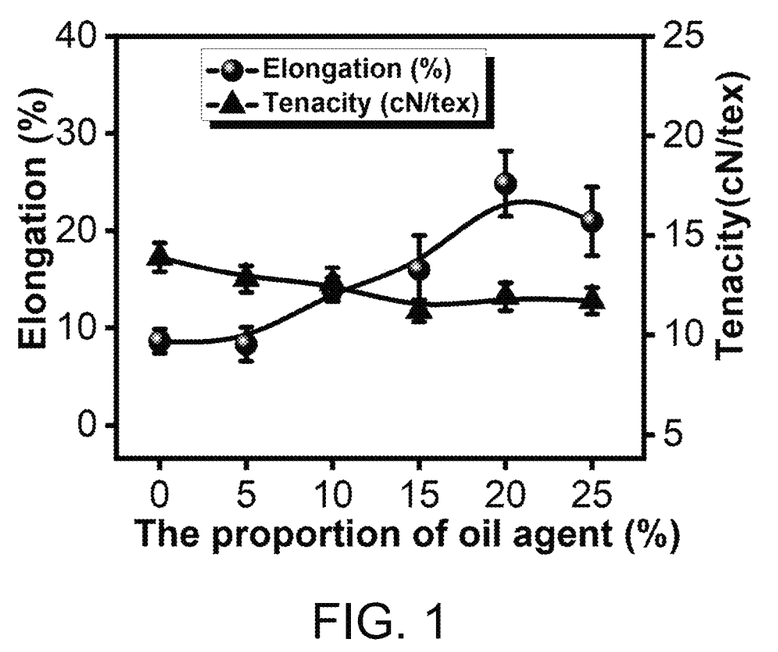
FIG. 1 shows the tensile properties of wool yarns under different oil agent ratios in embodiment 1 of the present disclosure.

The results are shown in FIG. 1. With a constant temperature and humidity, when the ratio of the oil agent increased from 0% to 20%, the breaking elongation of wool yarns increased accordingly. The increase of the breaking elongation was more significant when the oil agent ratio increased from 5% to 20%. When the oil agent ratio increased from 20% to 25%, the breaking elongation showed a decreasing trend. The tenacity of the wool yarns presented a decreasing trend when the oil agent ratio was below 15%, and when it exceeded 15%, the wool yarn tenacity remained unchanged.

The results of this experimental embodiment indicated that applying a certain amount of the oil agent to waste wool yarns effectively reduced the friction between fibers, which made the yarn softer, and significantly improved the yarn's breaking elongation, and reduced the loss of yarn tenacity to a certain extent. When the amount of the oil agent was too large, it was easy to accumulate on the surface of the fibers, forming a rough and uneven film on the fiber surface, which would lead to an increase in the friction coefficient between fibers. In addition, excessive amount of the oil agent in waste wool textiles would easily lead to a sticky effect between the oil on fiber surface and metal impurities, which was not conducive to the mechanical opening of textiles.

After conducting tensile tests and analysis, it was found that when the ratio of the oil agent was between 10% and 25%, the yarn had higher breaking elongation and strength, which helped reduce fiber damage during the opening process. When the ratio of oil agent was 20%, the yarn's breaking elongation reached the maximum.

Experimental Embodiment 2: Effects of Different Oil Agents on the Tensile Properties of Waste Wool Yarn The surface of waste wool yarns was evenly sprayed with the oil agents prepared in Table 1 at a mass ratio of 20% of the waste wool yarns. Then, the yarn was placed in a constant temperature and humidity box (0° C., RH 90%) and sealed for 24 hours before conducting tensile performance test in the laboratory.

TABLE 1

| No. | the oil agents used in the pretreatment | Yarn tenacity (cN/tex) [CV %] | Yarn breaking elongation (%) [CV %] | Average length of regenerated fibers(mm) [CV %] |
| --- | --- | --- | --- | --- |
| 0# | deionized:wool lubricant:anti-static agent = 12:1:0.3 | 12.6[4.6] | 22.7[12.3] | 28.3[27.5] |
| 1# | deionized water:wool lubricant:anti-static agent = 14:0.3:0.1 | 11.8[4.2] | 15.1[14.2] | 24.8[18.9] |
| 2# | Atomized silicone oil | 11.1[4.8] | 8.4[14.3] | N.A. |

The results are shown in Table 1. It can be seen that after being pretreated with the oil agent of this disclosure (i.e. deionized water:wool lubricant:antistatic agent=12:1:0.3), the 0 #sample presented significantly better yarn tenacity, yarn breaking elongation, and average length of regenerated fibers than the 1 #sample pretreated with a different oil agent ratio (deionized water:wool lubricant:antistatic agent=14: 0.3:0.1) and the 2 #sample pretreated with atomized silicone oil (Zhangjiagang Saier Fine Chemical Co., Ltd.). Wherein, the 2 #sample pretreated with atomized silicone oil showed a reduced yarn breaking elongation, and still had a lot of static electricity during the opening and combing process, resulting in serious fiber entanglement and unsuccessful process. Consequently, the recycled fibers failed to be produced to test their average length.

Experimental Embodiment 3: Effects of Different Temperatures on the Tensile Properties of Waste Wool Yarn High-temperature treatment of wool yarns for a long time will reduce the toughness of the yarns, and the yarn will be liable to breakage. Therefore, the pre-treatment temperature of the yarn should not be too high. The waste wool yarns treated with 20% of the oil agent was placed in a constant temperature and humidity box with a humidity of 90% and under different temperatures (0° C., 20° C., 30° C., 40° C., 50° C., and 60° C.) for 24 hours, and then the tensile properties of the yarns were tested.

Figure 2:
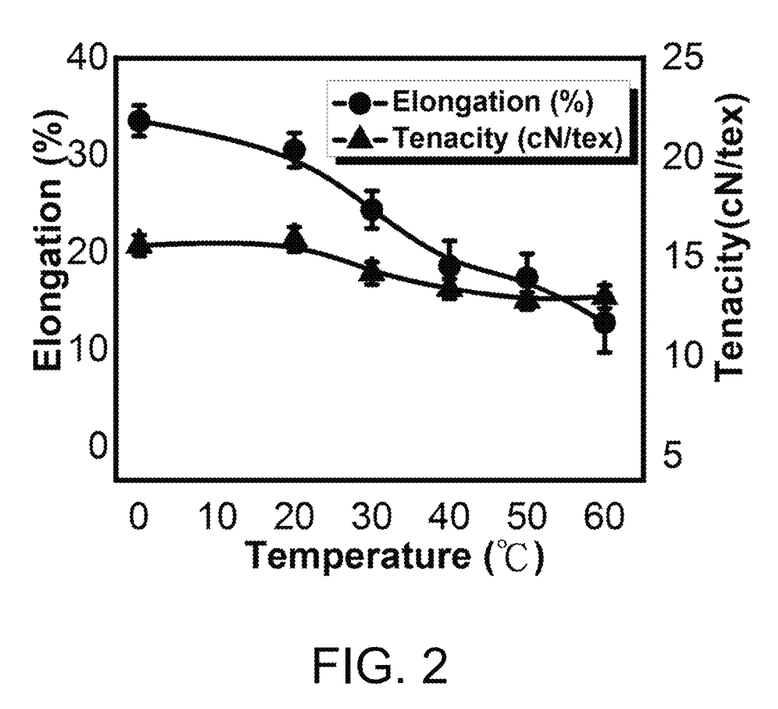
FIG. 2 shows the tensile properties of wool yarns under different temperatures in embodiment 3 of the present disclosure.

The result was shown in FIG. 2. The breaking elongation showed a decreasing trend from 0° C. to 60° C., wherein, the decreasing trend was very significant from 20° C. to 40° C., but slow from 40° C. to 60° C. The tenacity of the yarns showed a slow decreasing trend. During the temperature from 20° C. to 40° C., the breaking elongation and tenacity of the yarn markedly decreased. It might be because at 20° C., the moisture and oil in the yarn were fully utilized, making the wool yarn softer and having a higher breaking elongation. After the treatment at 40° C. for 24 hours, the moisture in the wool yarns evaporated, causing the oil agent to accumulate on the fiber surface to form an uneven film layer, resulting in severe cracking and roughness on the fiber surface. The friction between fibers increased, resulting in the reduction of the yarn tenacity and elongation. At the high temperatures of 50° C. to 60° C., the moisture content in the yarn decreased, and the chain segmental movement of wool keratin macromolecules was strengthened. The interaction between molecules weakened, causing disintegration of the cross-linking between molecules. The fiber had higher softness which can easily cause yarn deformation.

The breaking elongation and tenacity of the yarns decreased with the increase of temperature. Therefore, when pretreating waste wool fabrics before opening, the pretreatment temperature should be 0° C. to 20° C., and the optimal pretreatment temperature was 0° C. to 10° C.

Experimental Embodiment 4: Effects of Different Moisture Regains on the Tensile Properties of Waste Wool Yarns The moisture regain test followed the standard GB/T 6500-2008 "Test method for the moisture regain of wool fibers-oven method", and the oven used was DHG-9145A electric hot air drying oven. The moisture regain of the waste wool yarns treated with the oil agent can be adjusted by changing the relative humidity of the constant temperature and humidity box and spraying water. Two samples were prepared for each experiment, one which was used for measuring moisture regain, and the other one was used for yarn tensile testing. The moisture regain was set at 0%, 15%, 30%, 45%, 60%, 70%, 80%, and 90% for tensile testing (20% oil agent, temperature 0° C.).

Figure 3:
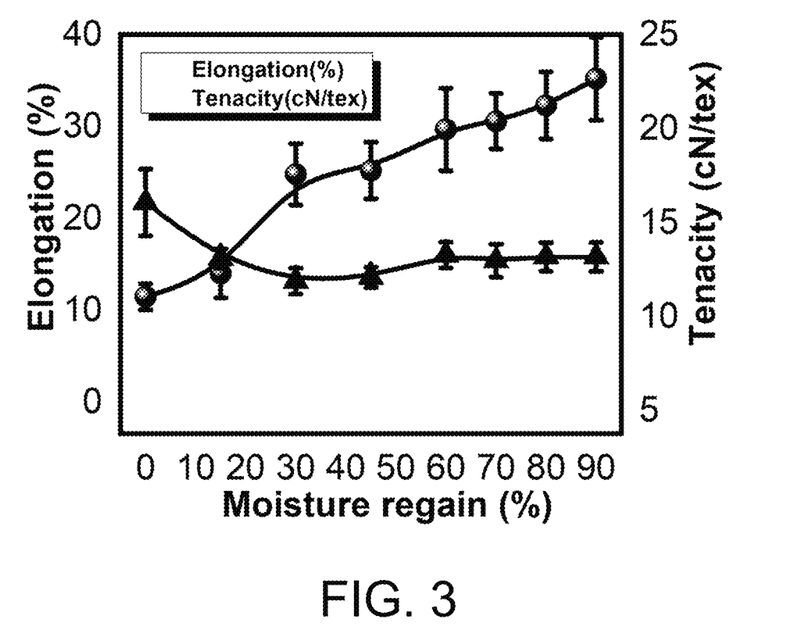
FIG. 3 shows the tensile properties of wool yarns under different moisture regains in embodiment 4 of the present disclosure.

The results are shown in FIG. 3. The breaking elongation of the yarn showed a significant increasing trend when the moisture regain was 0% to 30%, but it rarely changed when the moisture regain was between 30% and 45%. However, when it exceeded 45%, the breaking elongation presented a obvious rising trend. The tenacity of the yarns showed a markable decreasing trend between 0% and 30% and increased slightly between 30% and 65%. When the moisture regain exceeded 65%, the yarn tenacity remained almost unchanged.

When the moisture regain in the yarn was low, the lubrication effect of water between fibers in the yarn decreased, which was the main reason for the low breaking elongation of yarn. The breaking elongation of the yarn gradually increased with the enhancement of moisture regain. This was resulted from the plasticizing effect of moisture in the yarn, which improved the mechanical properties of the yarn and made the wool yarn softer and more elastic. When the moisture regain reached 90%, the yarn got the highest elongation of 35.2%. Whereas, the yarn tenacity decreased with the increase of the moisture regain, reaching the lowest at 30% of moisture regain. Then, it remained basically unchanged with the increase of the moisture regain. Based on the above analysis, when pretreating waste wool fabrics before opening, the moisture regain could be 30% to 90%.

Based on the results of the above experimental embodiment 1 to 3, it can be concluded that the optimal pretreatment conditions for waste wool textiles before mechanical opening were: oil agent ratio: 15% to 25%, ambient temperature: 0° C. to 10° C., and moisture regain: 80% to 90%, sealing for 24 hours. After this pretreatment, the yarns in the wool textiles had high breaking elongation and tenacity.

Experimental Embodiment 5: Effects of Pretreatment on the Mechanical Properties of Wool Fibers After Opening After the waste wool fabrics were pretreated as described in Embodiment 1 (oil agent ratio: 20%, temperature: 0° C., moisture regain: 90%, and sealing for 24 hours), the wool fibers obtained by mechanical opening was designated as Sample 1. The wool fibers obtained from the wool fabrics by mechanical opening without pretreatment was designated as Sample 2. A certain amount of wool fibers were disassembled from the fabrics as raw wool fiber, designated as Sample 0, and the fiber should not be damaged during the disassembling process. The fiber length, fineness, and tensile properties of the three samples were tested, respectively. The test results of the three wool fiber samples are shown in Table 2.

TABLE 2

| Sample | Fiber Length (mm)[Cv %] | Fiber tenacity (cN/tex)[Cv %] | Fiber breaking elongation (%)[Cv %] | Short-fiber content (%) | Fiber length loss rate (%) |
|---|---|---|---|---|---|
| NO. 0 | 58[25.3] | 1.28[14.1] | 24.05[32.1] | 7.8 | / |
| NO. 1 | 28.3[27.5] | 1.41[14.3] | 32.71[27.2] | 30.5% | 51.2% |
| NO. 2 | 25.4[22.5] | 1.37[15.1] | 29.71[18.4] | 46.1% | 56.2% |

Note:
Sample 0 was raw wool fiber; sample 1 was the wool fiber obtained by pretreatment and opening according to the present disclosure; sample 2 was the wool fiber obtained by opening without pretreatment.

From the results in Table 2, it can be seen that the fiber fineness, tenacity, and breaking elongation of Sample 2 were all higher than those of Sample 0, which may be caused by mechanical action during the opening process. The tenacity and breaking elongation of Sample 1 were higher than those of Sample 2, which may be related to the residual oil agent on the fiber surface. The fiber fineness of Sample 1 was lower than that of sample 2, which was because the mechanical action made the fiber flat, and the effect of the oil agent reduced the damage to the fiber during opening. The wool fibers obtained by opening process without pretreatment had a fiber length of 25.4 mm, while the wool fiber obtained by opening after pretreatment had a length of 28.3 mm, and the average length of the regenerated fiber increased by about 3 mm. The fiber length loss rate was the main factor reflecting the fiber damage before and after fiber opening process. The fiber length loss rate of Sample 1 was 51.2%, and the one of sample 2 was 56.2%. The length loss rate of the regenerated fibers obtained from the waste fabrics by opening after the pretreatment of the disclosure was decreased by 5.0%, proving that the pretreatment before mechanical opening can effectively protect the waste wool fabrics from the damage of fiber length during opening process.

Compared with Sample 2, the fiber length loss rate of Sample 1 decreased by 5.0%, the short fiber content decreased by 15.6%, the tenacity increased by 3%, and the breaking elongation increased by 10%. It can be seen that the wool fiber obtained by opening after pretreatment had higher overall performances than the wool fibers obtained by opening without pretreatment.

In summary, the results of this experimental embodiment indicated that the wool fibers obtained from the waste wool fabrics by mechanical opening after the pretreatment described in the present disclosure had higher fiber length, fineness, and tenacity than the wool fibers obtained from the wool fabric opened without pretreatment, which effectively reduced the short fiber content of wool fibers.

Experimental Embodiment 6: Effects of Pretreatment on the Surface Structure of Wool Fibers After Opening To investigate the effect of the pretreatment conditions on fiber damage during mechanical opening of waste wool textiles, three fiber samples, No. 0, 1, and 2 in Embodiment 5 was used to conduct electron microscopy experiments by means of EVO18 scanning electron microscopy with a large cavity. The electron microscopy images of different fiber samples were shown in FIG. 4.

Figure 4:
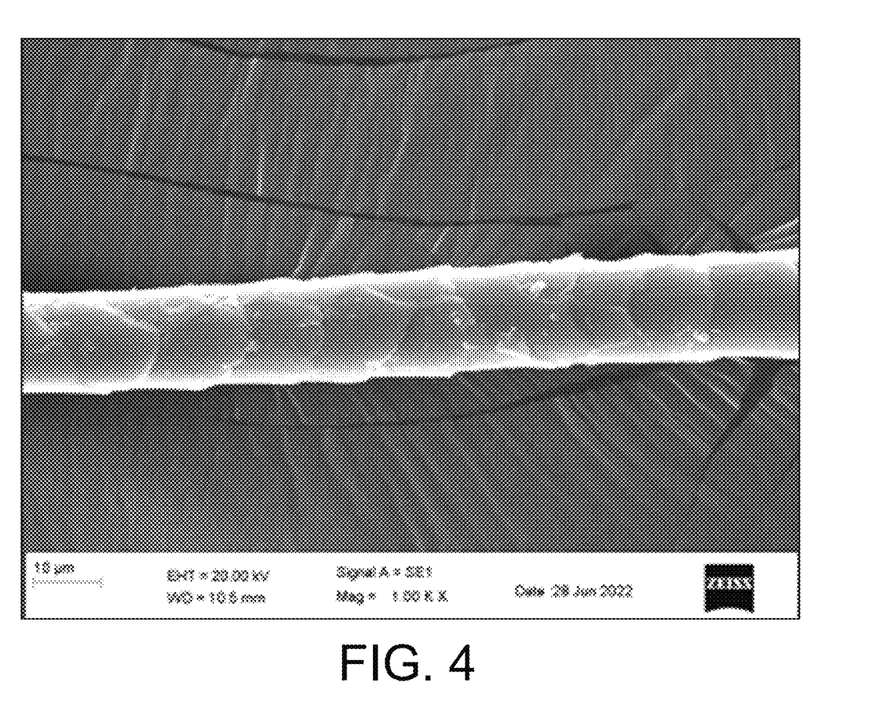
FIG. 4 shows the electron microscopy image of No. 0 fiber sample in embodiment 6 of the present disclosure at 1000 times magnification.
Figure 5:
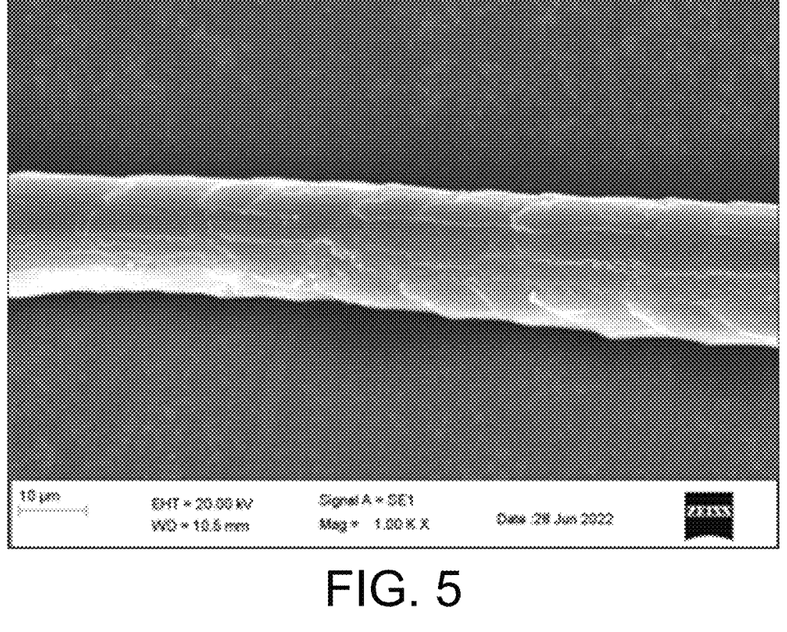
FIG. 5 shows the electron microscopy image of No. 1 fiber sample in embodiment 6 of the present disclosure at 1000 times magnification.
Figure 6:
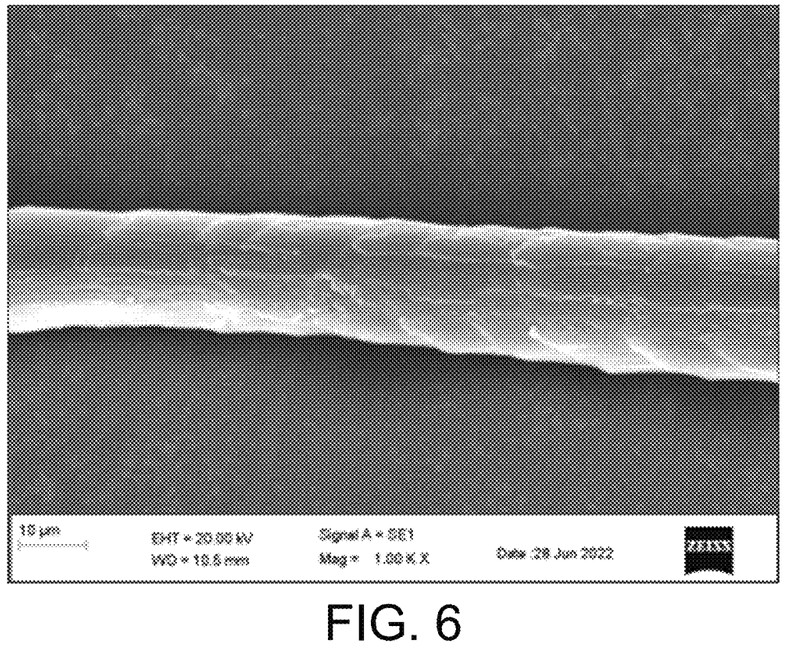
FIG. 6 shows the electron microscopy image of No. 2 fiber sample in embodiment 6 of the present disclosure at 1000 times magnification.

FIGS. 4, 5, and 6 were the electron microscopy images of fiber samples No. 0, 1, and 2 at 1000 times magnification, respectively. As can be seen from FIG. 4, the wool fibers obtained from the opening process without pretreatment (FIG. 6) were severely damaged with obvious scratches on the fiber surface, flattened fibers, and damaged scale structures. The wool fibers obtained from the opening process with pretreatment (FIG. 5) had no scratches on the surface, the scale structure of which was protected. It is proved that the pretreatment effectively reduced the damage of the fibers during the opening process. Compared with the fiber sample 0 (FIG. 4), fiber sample 1 (FIG. 5) had flaky or granular substances on its surface, which might be some oil residue on the fiber surface after water evaporation.

The results of this experimental embodiment indicated that the pretreatment method described in the present disclosure applied to the waste wool textiles before opening process, protected the main body of the wool fibers and reduced the fiber damage during mechanical opening.

The technical features of the embodiments above can be combined arbitrarily. To simplify the description, not all possible combinations of the technical features of the embodiments above are described. However, as long as there is no contradiction in the combination of these technical features, they should be considered to be within the scope of the specification.

The embodiments above merely express several implementations of the present disclosure. The descriptions of the embodiments are relatively specific and detailed, but may not therefore be construed as the limitation on the patent scope of the present disclosure. It should be noted that a person of ordinary skill in the art may further make several variations and improvements without departing from the concept of the present disclosure. These variations and improvements all fall within the protection scope of the present disclosure. Therefore, the patent protection scope of the present disclosure shall be defined by the appended claims.

The invention claimed is:

1. A pretreatment method for opening waste wool textiles, comprising the following steps: spraying an oil agent evenly on a surface of the waste wool textiles, and then sealing;
   wherein an amount of the oil agent is 10% to 25% of a mass of the waste wool textiles;
   a temperature of the sealing condition is 0° C. to 20° C., and a moisture regain is 30% to 90%;
   a sealing time is 20 hours to 30 hours; and
   the oil agent includes deionized water, a wool lubricant and an anti-static agent in a mass ratio of 11 to 13:0.8 to 1.2:0.2 to 0.4.

2. The pretreatment method for opening waste wool textiles according to claim 1, wherein the amount of the oil agent is 15% to 25% of the mass of the waste wool textiles.

3. The pretreatment method for opening waste wool textiles according to claim 1, wherein the amount of oil agent is 19% to 21% of the mass of the waste wool textiles.

4. The pretreatment method for opening waste wool textiles according to claim 1, wherein the temperature is 0° C. to 10° C.

5. The pretreatment method for opening waste wool textiles according to claim 1, wherein the moisture regain is 80% to 90%.

6. The pretreatment method for opening waste wool textiles according to claim 1, wherein the mass ratio of the deionized water, the wool lubricant and the anti-static agent is 12:1:0.3.

7. A method for opening waste wool textiles, comprising the following steps: before an opening process, performing a pretreatment to the waste wool textiles by using the pretreatment method according to claim 1.

* * * * *